July 27, 1948.  W. FROST  2,445,912
COTTON BALE MIXING AND OPENING MACHINE
Filed Feb. 6, 1946  3 Sheets-Sheet 1

Inventor
W. Frost
By Glascock Downing Tuttle attys.

July 27, 1948. W. FROST 2,445,912
COTTON BALE MIXING AND OPENING MACHINE
Filed Feb. 6, 1946 3 Sheets-Sheet 3

Inventor
W. Frost

Patented July 27, 1948

2,445,912

UNITED STATES PATENT OFFICE 2,445,912

COTTON BALE MIXING AND OPENING MACHINE

Walter Frost, Rochdale, England

Application February 6, 1946, Serial No. 645,877
In Great Britain February 26, 1945

4 Claims. (Cl. 19—80)

This invention has for its object to provide an improved machine for mixing and opening cotton from bales, the machine having a very effective opening action upon the cotton and providing for a uniform mixing of cotton from different bales.

The invention consists in a cotton bale opening machine comprising bale conveying means which pass the bales over at least one revolving toothed cylinder arranged with its teeth projecting slightly above the level at which the bottom of the bales are supported when travelling over such cylinder, so that the said teeth detach and beat off from the bottom of each bale a thickness of cotton which is opened out and can be collected.

The invention further comprises the arrangement in which the conveyors pass the bales back and forth automatically over at least one revolving toothed cylinder so that the opening of the bales is completed automatically.

The invention further comprises the arrangement in which the conveyors pass the bales continuously in a path which constitutes a closed figure over one or more revolving toothed cylinders arranged in such path.

The invention further comprises the arrangement in which bales of different qualities of cotton in correct relative numbers are dealt with at one time so that a proportioning and mixing of the different cottons will be obtained automatically to suit requirements.

The invention further comprises the arrangement in which the teeth upon each revolving cylinder pass between fixed teeth which act to strip the cotton from the moving teeth.

Referring to the accompanying explanatory drawings.

Figure 1:
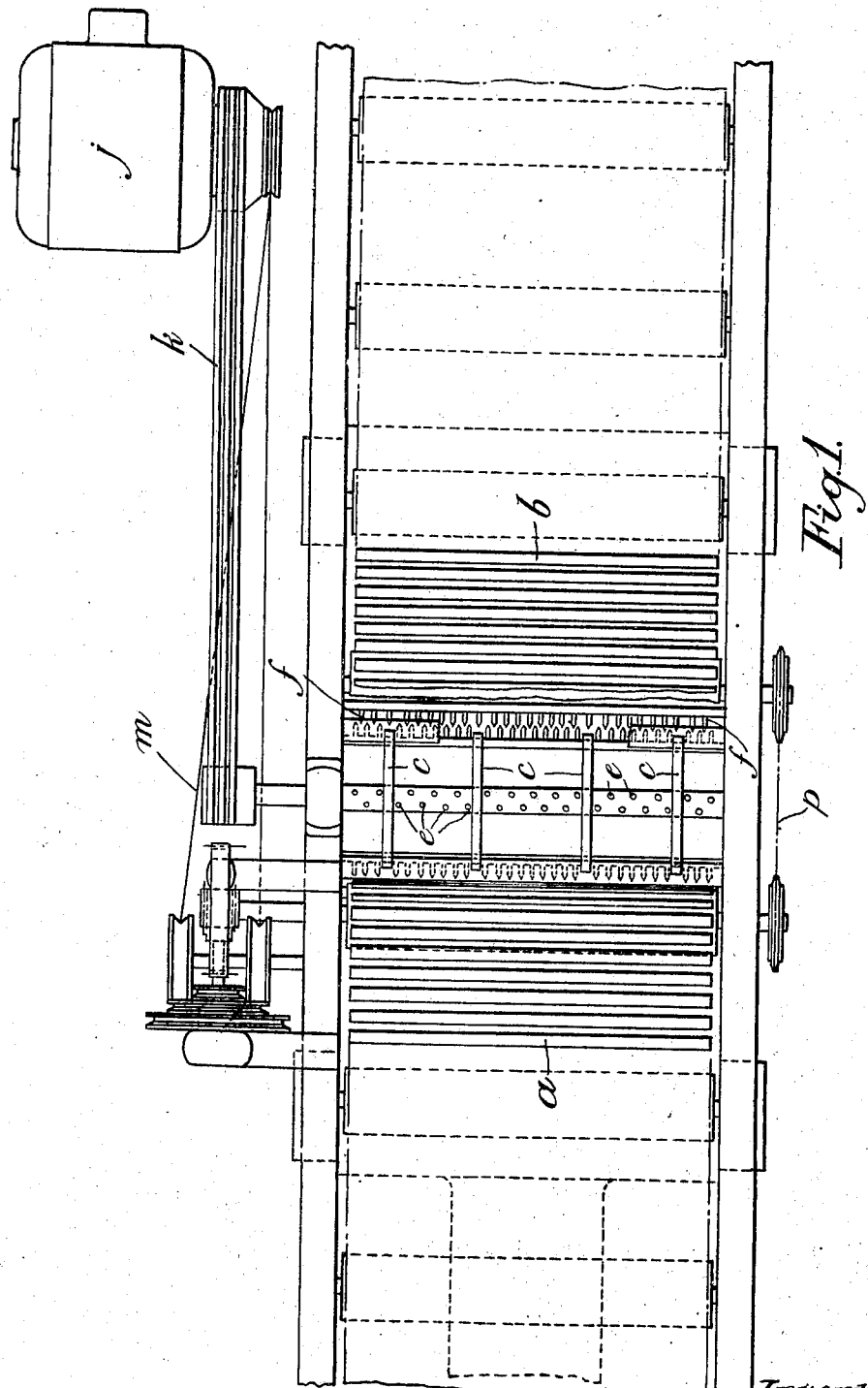
Figure 1 is a plan view and Figure 2 a side elevation of part of a bale opening machine constructed in one convenient form in accordance with this invention.
Figure 2:
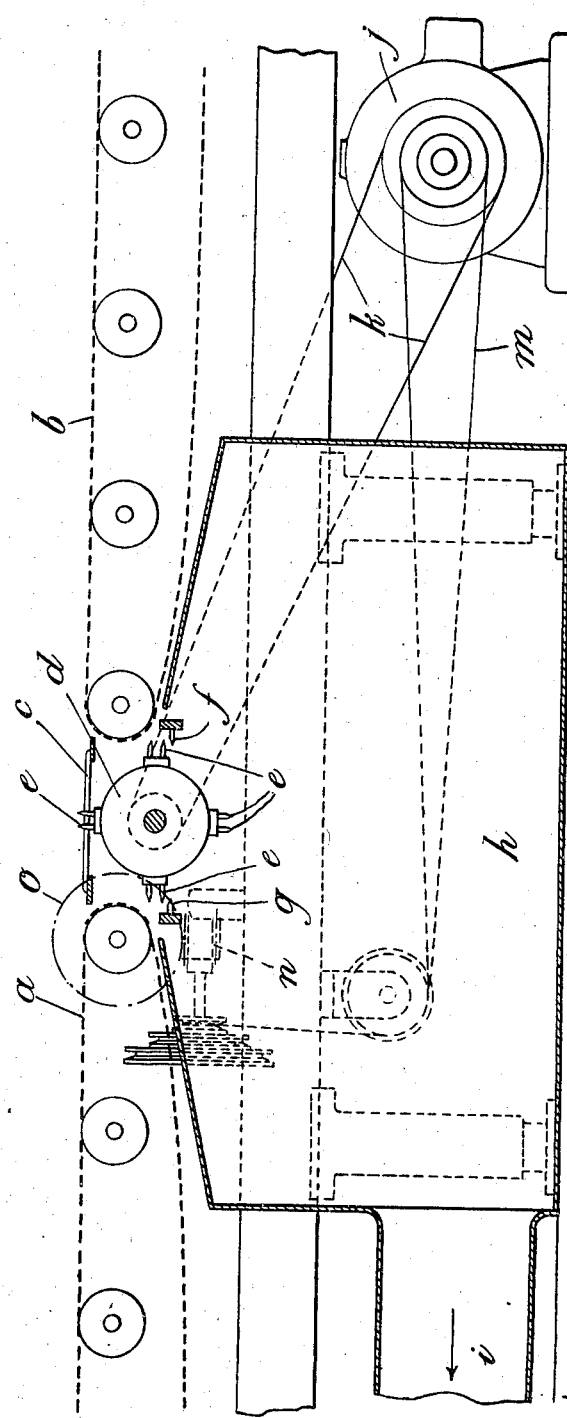

The machine illustrated in Figures 1 and 2 comprises two continuous lattice conveyors $a$ and $b$ disposed at the opposite sides of bale supporting bars or strips $c$ beneath which is a high speed revolving toothed cylinder $d$. The teeth $e$ upon the latter will as the cylinder revolves project slightly above the level of the bars or strips $c$. At opposite sides of the toothed cylinder $d$ are disposed fixed rows of teeth $f$ and $g$ which act to strip cotton from the teeth $e$ of the revolving cylinder $d$. A cotton receiving chamber $h$ is disposed below the cylinder and the cotton delivered therein may be withdrawn by suction through the outlet $i$.

The teeth $e$, $f$ and $g$ may be cylindrical with pointed ends. The teeth $e$ may be in two rows and staggered with relation to one another, the two rows being upon plates or bars readily detachable from the cylinder $d$.

The cylinder $d$ is driven from the motor $j$ by the belt $k$ and the motor $j$ also drives the conveyor $a$ by a belt $m$ and worm $n$ and worm wheel $o$. The conveyor $b$ is driven in unison with the conveyor $a$ by a chain $p$ (Figure 1). The direction of rotation of the motor $j$ may be reversed automatically when the bale upon the conveyors has passed fully on to the conveyor $a$ and again when it has passed fully on to the conveyor $b$. If several bales are being opened simultaneously, then reversal will be effected when all the bales have passed completely from one conveyor to the other. The reversal may be effected by tappet operated switches, the tappets being upon the conveyors or upon parts connected thereto.

If bales of different qualities of cotton be passed through my improved machine in correct relative numbers, a proportioning and mixing of the different cottons will be obtained to suit requirements.

Figure 3:
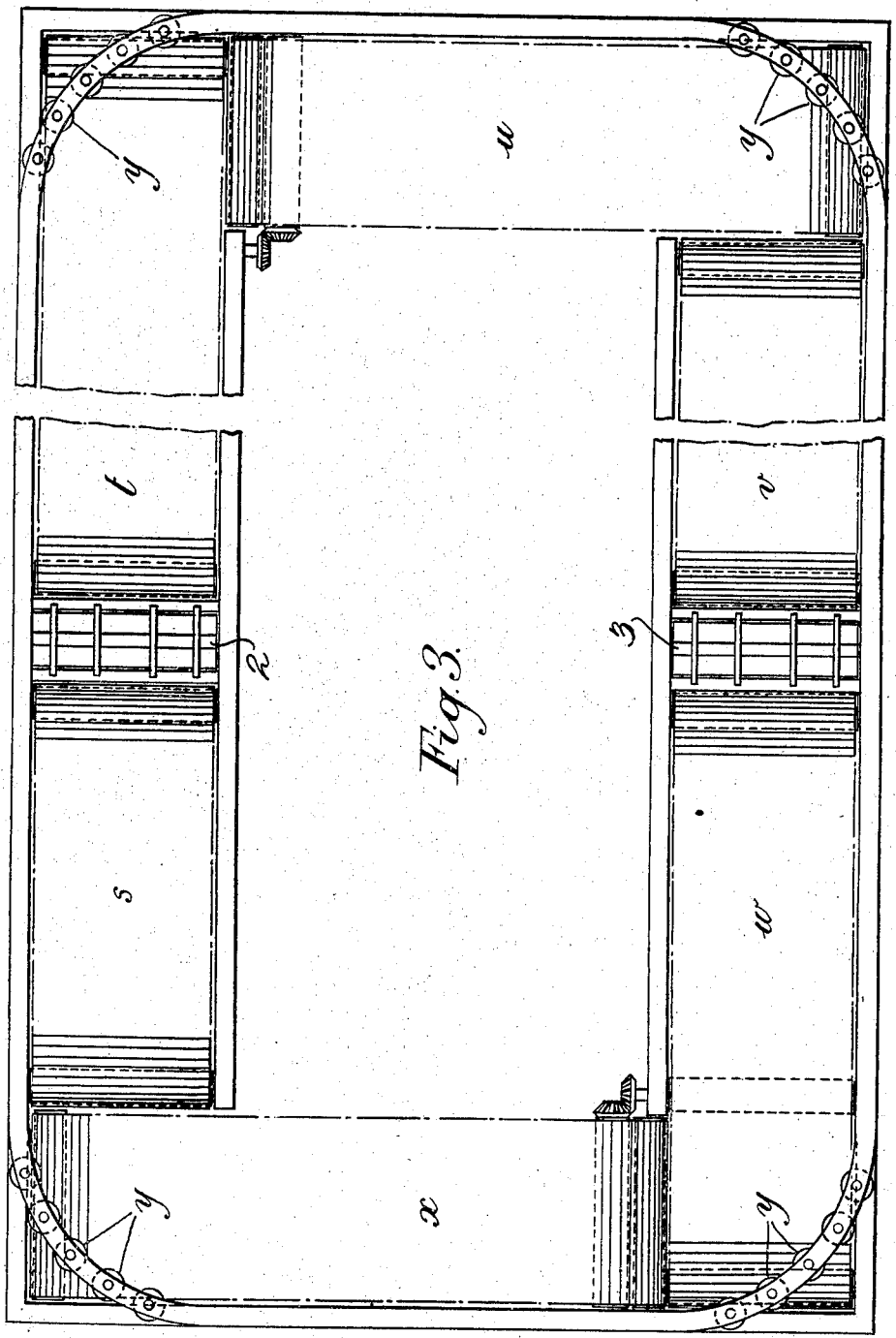
Figure 3 is a plan view showing a modified arrangement of my improved bale opening machine.

In the arrangement illustrated in Figure 3, the bales being opened travel continuously in a path which constitutes a closed figure, so that opening continues until the bales are finished. It will be seen that there are several conveyors $s$, $t$, $u$, $v$, $w$ and $x$ which are all driven in unison at uniform speed and that rollers $y$ facilitate the turning of the bales from one direction of travel to another. Two toothed cylinders are arranged in the machine as illustrated, one at 2 and the other at 3 but I may provide more toothed cylinders if required and the length of the conveyors may be such as to deal with any desired number of bales simultaneously.

The advantages of my invention are fairly obvious for it is only necessary to place bales upon the conveyors when opening proceeds automatically with also correct mixing if required. A new bale may be placed on the last part of a previous bale to ensure satisfactory opening to the end of the bale.

What I claim is:

1. In a machine for opening bales of cotton, two conveyors of the endless band type, arranged horizontally and in line with one another, the distance between the ends of the conveyors being less than the length of a bale, a toothed cylinder arranged between the conveyors, with its teeth projecting slightly above the level of the conveyors, means for driving the conveyors to convey a bale of cotton from one conveyor over the toothed cylinder to the other conveyor, and means for rotating the toothed cylinder so that its teeth detach and open out a layer of cotton from the bottom of the bale as it passes from one conveyor to the other.

2. In a machine for opening bales of cotton, at least one arrangement as claimed in claim 1, in combination with further conveyors for carrying bales of cotton, whereby the bales are passed continuously in a closed path over at least one revolving toothed cylinder.

3. In an arrangement as claimed in claim 1, the provision of fixed teeth below the level of the conveyors projecting between the teeth on the revolving cylinder for stripping the cotton from the moving teeth.

4. In an arrangement as claimed in claim 1, the provision of suction means for carrying away the cotton detached by the teeth on the revolving cylinder.

WALTER FROST.

REFERENCES CITED

The following references are of record in the file of this patent:

UNITED STATES PATENTS

| Number | Name | Date |
| --- | --- | --- |
| 543,584 | Patterson | July 30, 1895 |
| 573,931 | Swenson | Dec. 29, 1896 |
| 1,545,367 | Tice | July 7, 1925 |
| 1,929,344 | Benoit | Oct. 3, 1933 |